(12) United States Patent
Buck et al.

(10) Patent No.: US 8,023,760 B1
(45) Date of Patent: Sep. 20, 2011

(54) SYSTEM AND METHOD FOR ENHANCING LOW-VISIBILITY IMAGERY

(75) Inventors: David L. Buck, San Diego, CA (US); Brian T. Williams, San Diego, CA (US); Elan Sharghi, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 956 days.

(21) Appl. No.: 11/952,041

(22) Filed: Dec. 6, 2007

(51) Int. Cl.
*G06K 9/00* (2006.01)
*G06K 9/40* (2006.01)

(52) U.S. Cl. ........ 382/260; 302/168

(58) Field of Classification Search .......... 348/682, 348/678; 382/128–132, 168–172, 254–266, 382/274
See application file for complete search history.

(56) References Cited

U.S. PATENT DOCUMENTS

| | | | | |
|---|---|---|---|---|
| 5,012,333 A * | 4/1991 | Lee et al. | ...................... | 358/520 |
| 5,046,118 A * | 9/1991 | Ajewole et al. | ............... | 382/169 |
| 5,239,378 A * | 8/1993 | Tsuji et al. | ..................... | 348/625 |
| 5,410,618 A * | 4/1995 | Fowler | ........................... | 382/254 |
| 5,799,106 A * | 8/1998 | Mooney et al. | ................ | 382/172 |
| 5,963,665 A * | 10/1999 | Kim et al. | ...................... | 382/169 |
| 6,275,605 B1 * | 8/2001 | Gallagher et al. | ............. | 382/162 |
| 6,438,264 B1 * | 8/2002 | Gallagher et al. | ............. | 382/167 |
| 6,594,388 B1 * | 7/2003 | Gindele et al. | ................ | 382/167 |
| 7,474,334 B1 * | 1/2009 | Patterson | ................. | 348/207.99 |
| 7,613,338 B2 * | 11/2009 | Yano | .............................. | 382/162 |
| 7,885,462 B2 * | 2/2011 | Paik | .............................. | 382/168 |
| 2005/0254707 A1 * | 11/2005 | Takahashi | ..................... | 382/169 |

* cited by examiner

*Primary Examiner* — Gregory M Desire
*Assistant Examiner* — Andrae S Allison
(74) *Attorney, Agent, or Firm* — Ryan J. Friedl; Kyle Eppele

(57) ABSTRACT

A method includes the steps of selecting an image filtering technique, receiving an image from an image source, processing the received image to provide a processed image, and displaying the processed image to a user. Processing the received image includes the steps of adjusting the received image to provide an adjusted image, filtering the adjusted image according to the selected image filtering technique to provide a filtered image, and adjusting the filtered image. The image filtering technique may be selected from histogram equalization, band-pass filtering, adaptive enhancement filtering, or other techniques. The method may be used in an image processing system having memory, a processor, and a display.

9 Claims, 9 Drawing Sheets

SYSTEM AND METHOD FOR ENHANCING LOW-VISIBILITY IMAGERY

FEDERALLY-SPONSORED RESEARCH AND DEVELOPMENT

The System and Method for Enhancing Low-Visibility Imagery was developed with Federal funds and is assigned to the United States Government. Licensing inquiries may be directed to Office of Research and Technical Applications, Space and Naval Warfare Systems Center, San Diego, Code 2112, San Diego, Calif., 92152; telephone 619-553-2778; email: T2@spawar.navy.mil. Reference Navy Case No. 98937.

BACKGROUND OF THE INVENTION

The invention relates generally to the field of image processing.

Adverse visibility conditions, such as haze, smog, dust, and smoke, and adverse weather conditions, such as fog, snow, and rain, reduce the ability for current image-recognition devices to accurately detect objects. In the littoral environment, the reduced visibility caused by adverse visibility and weather conditions can cause catastrophic harm. Further, adverse visibility and weather conditions can significantly impact road visibility for land-based vehicles or air-based vehicles attempting to land at a designated landing zone.

Therefore, there is a need for a method for enhancing imagery detection in low-visibility conditions.

DETAILED DESCRIPTION OF SOME EMBODIMENTS

Figure 1:
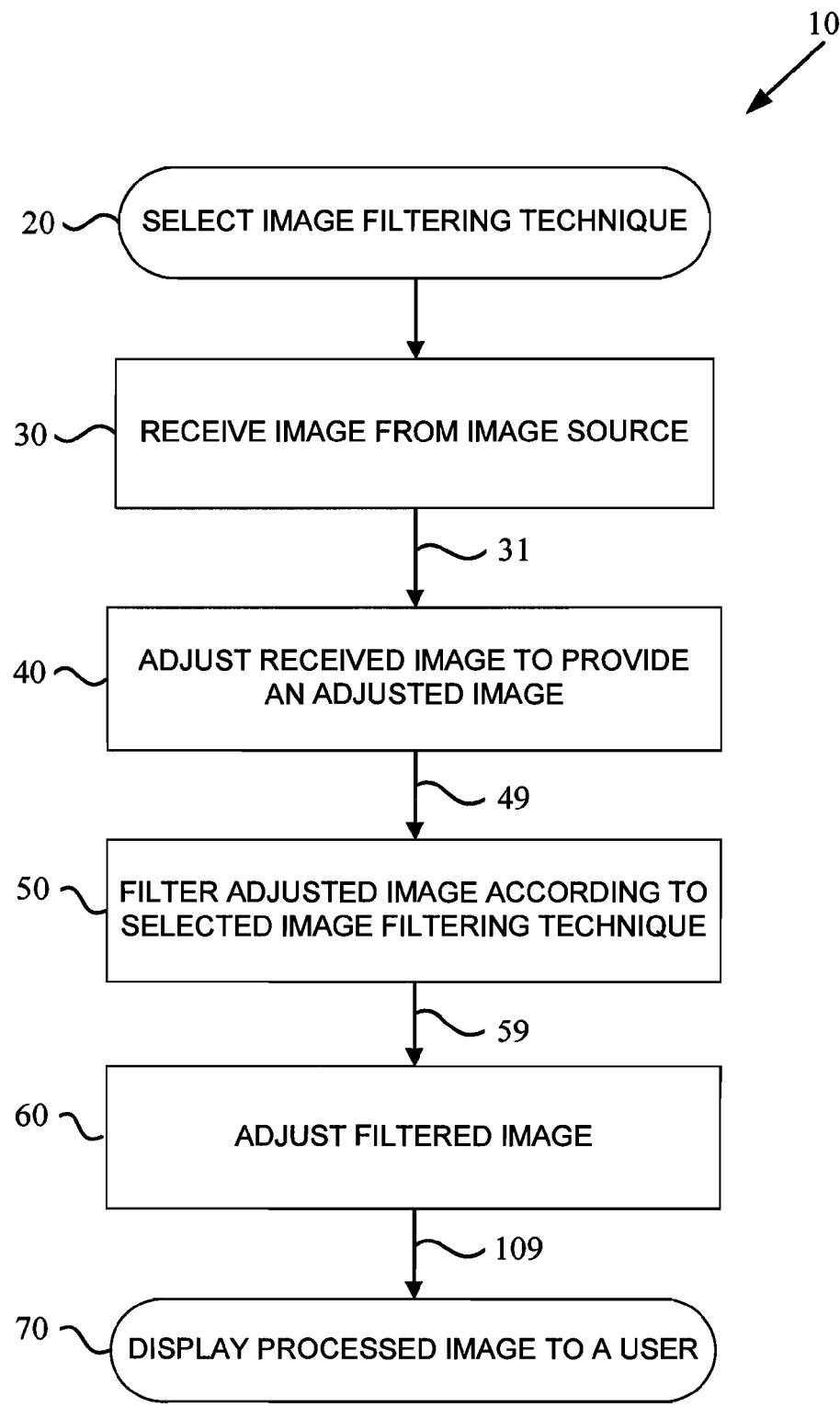
FIG. 1 shows a flowchart of one embodiment of the method for enhancing low-visibility imagery.
Figure 7:
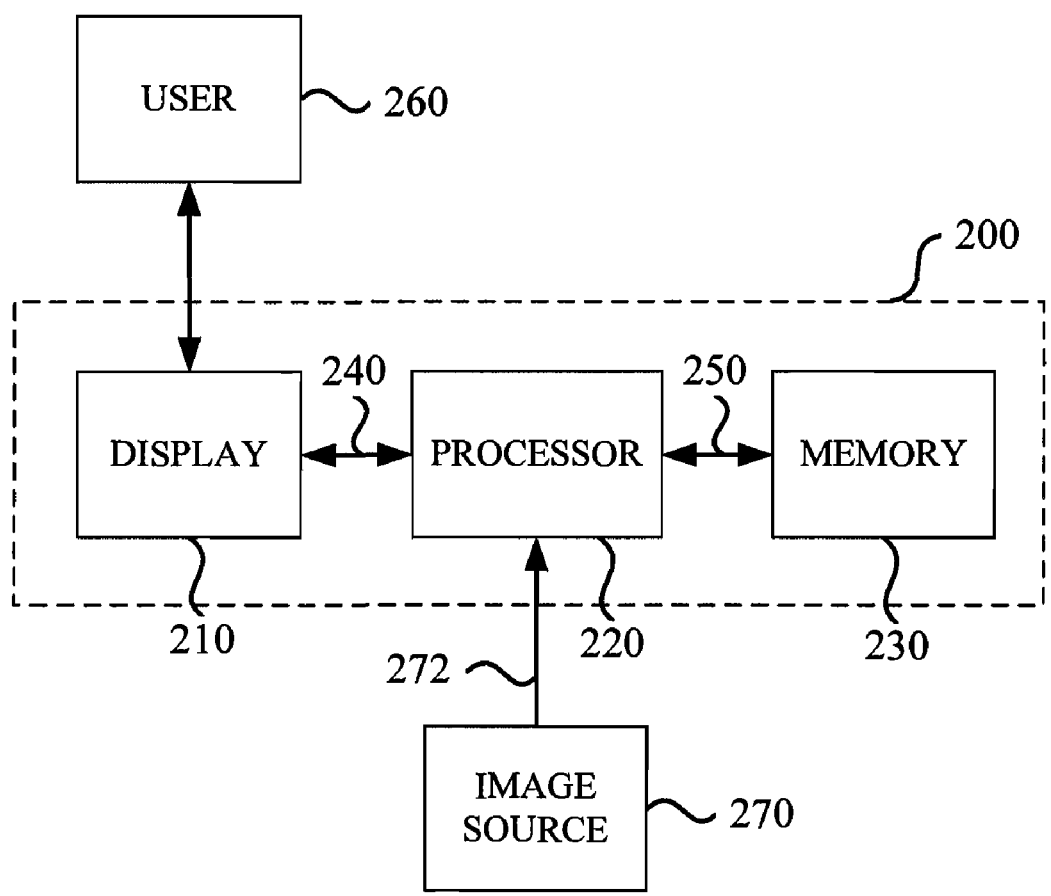
FIG. 7 shows a block diagram of one embodiment of a system for using a method for enhancing low-visibility imagery.
Figure 8:
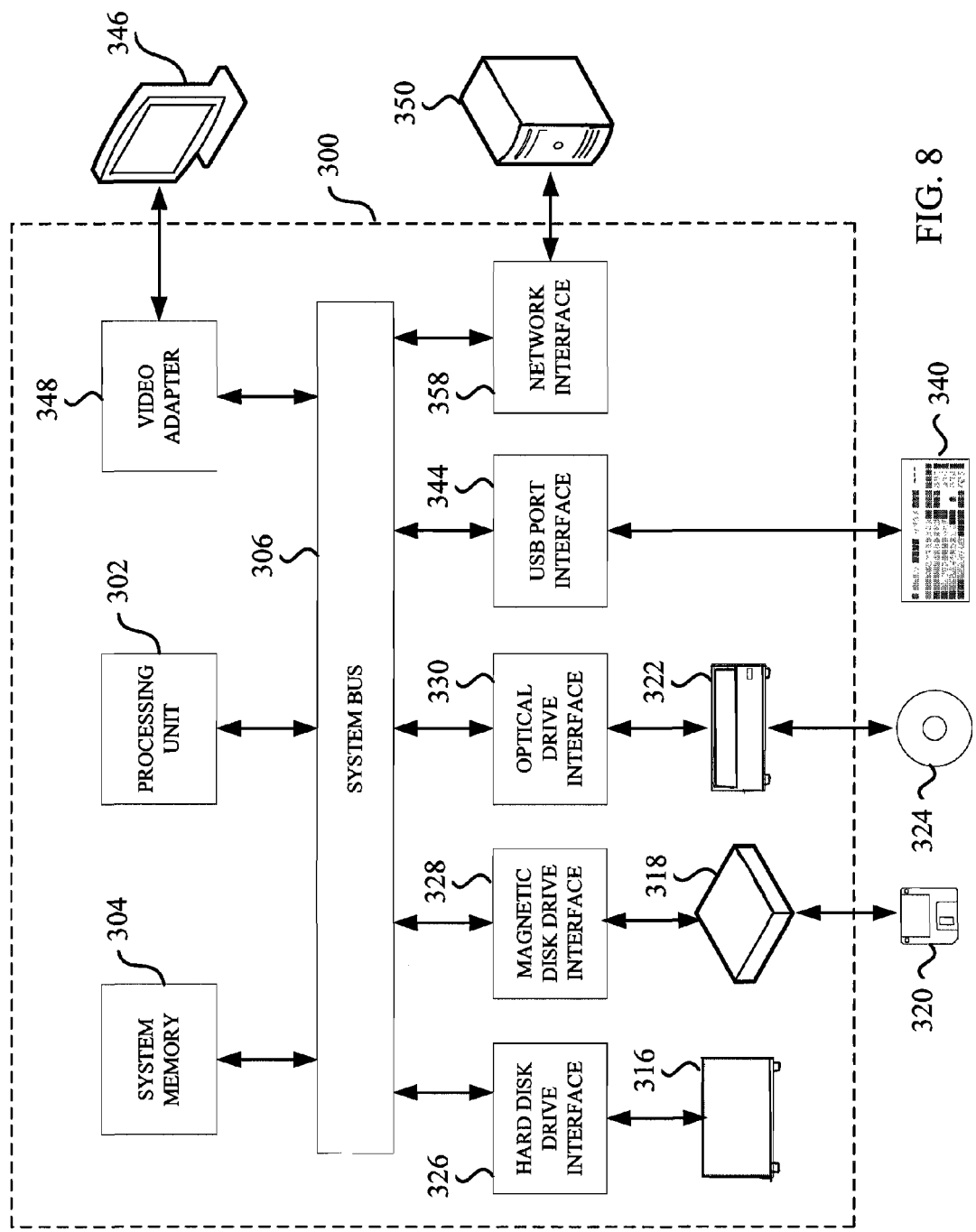
FIG. 8 shows a diagram of one embodiment of a system for using a method for enhancing low-visibility imagery.

Referring to FIG. 1, there is shown a flowchart of one embodiment of the method for enhancing low-visibility imagery 10. Method 10 may be performed by a system such as system 200 as shown in FIG. 7 or system 300 as shown in FIG. 8 and discussed herein. For illustrative purposes, method 10 will be discussed with reference to system 200. In some embodiments, one or more steps of method 10 may be performed by processor 220 using software stored within memory 230. Method 10 may begin at step 20, where a user selects an image filtering technique. As an example, a user 260 may select an image filtering technique by inputting information into display 210 of system 200. Method 10 may then proceed to step 30, where an image is received from an image source, such as image source 270. Following step 30, the received image may be processed to provide a processed image. The processing may occur by processor 220 by software stored either within processor 220 or within memory 230.

The processing of the received image may begin at step 40, where the received image is adjusted to provide an adjusted image. As an example, an adaptive level adjustment may be performed at step 40, where the level and type of adaptive level adjustment depends upon calculated image statistics of the received image. The adaptive level adjustment may include segmenting the received image into a matrix of n by m sub-images and filtering each of the sub-images based on the calculated image statistics of the received image. As another example, step 40 may involve performing an adjustment based on a user-defined adjustment algorithm. Such a user-defined algorithm may be provided by the user and stored by the user in memory 230. Step 40 is discussed in greater detail with reference to FIG. 2. Following step 40, method 10 may proceed to step 50, where the adjusted image is filtered according to the image filtering technique selected by the user in step 20. Method 10 may then proceed to step 60, where the filtered image is adjusted. Step 60 is discussed in greater detail with reference to FIG. 6. After step 60, the processing of the received image may be complete. However, in other embodiments of method 10, additional processing may be performed, as would be recognized by one having ordinary skill in the art. Method 10 may then proceed to step 70, where the processed image is displayed to a user.

Figure 2:
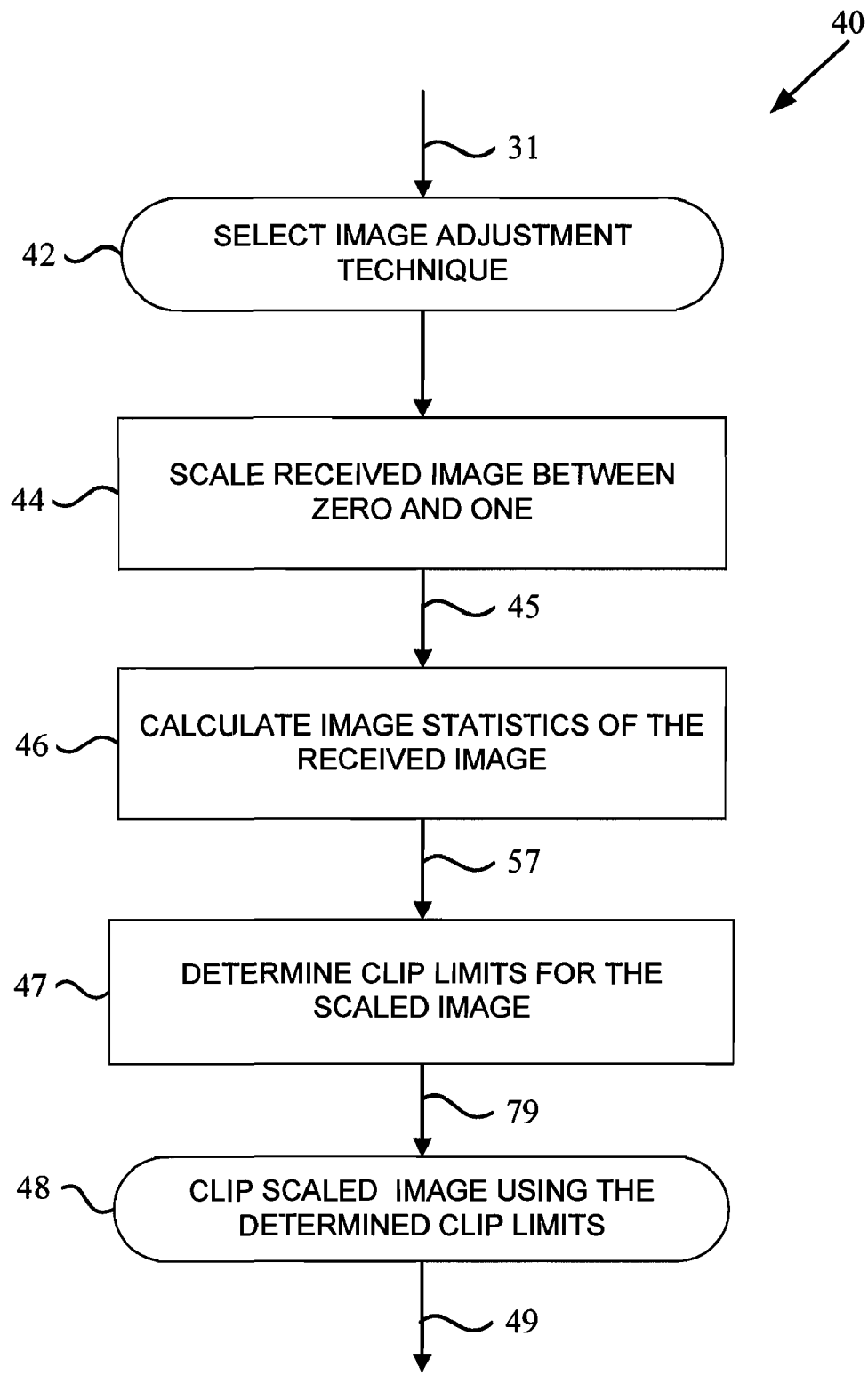
FIG. 2 shows a flowchart of one embodiment of a step for adjusting a received image, in accordance with the method for enhancing low-visibility imagery.

Referring to FIG. 2, step 40 may begin at step 42, where the user selects an image adjustment technique. The image filtering technique may be selected from the group of image filtering techniques consisting of histogram equalization, band-pass filtering, and adaptive enhancement filtering. However, other image filtering techniques may be suitable for use within method 10, as would be recognized by one having ordinary skill in the art. Following step 42, step 40 may proceed to step 44, where the received image is scaled between zero and one. Step 44 may be performed according to generally accepted image scaling techniques, so long as the technique allows for image scaling between the values zero and one. Step 40 may then proceed along flow path 45 to step 46, where image statistics are calculated for the received image. Step 46 is discussed in greater detail with respect to FIG. 3. Next, step 40 may proceed along flow path 57 to step 47, where clip limits are determined for the scaled image. Step 47 is discussed in greater detail with respect to FIG. 4. Step 40 may then proceed along flow path 79 to step 48, where the scaled image is clipped using the determined clip limits. Step 48 is discussed in greater detail with respect to FIG. 5. After step 48, method 10 may proceed to step 50 along flow path 49.

Figure 3:
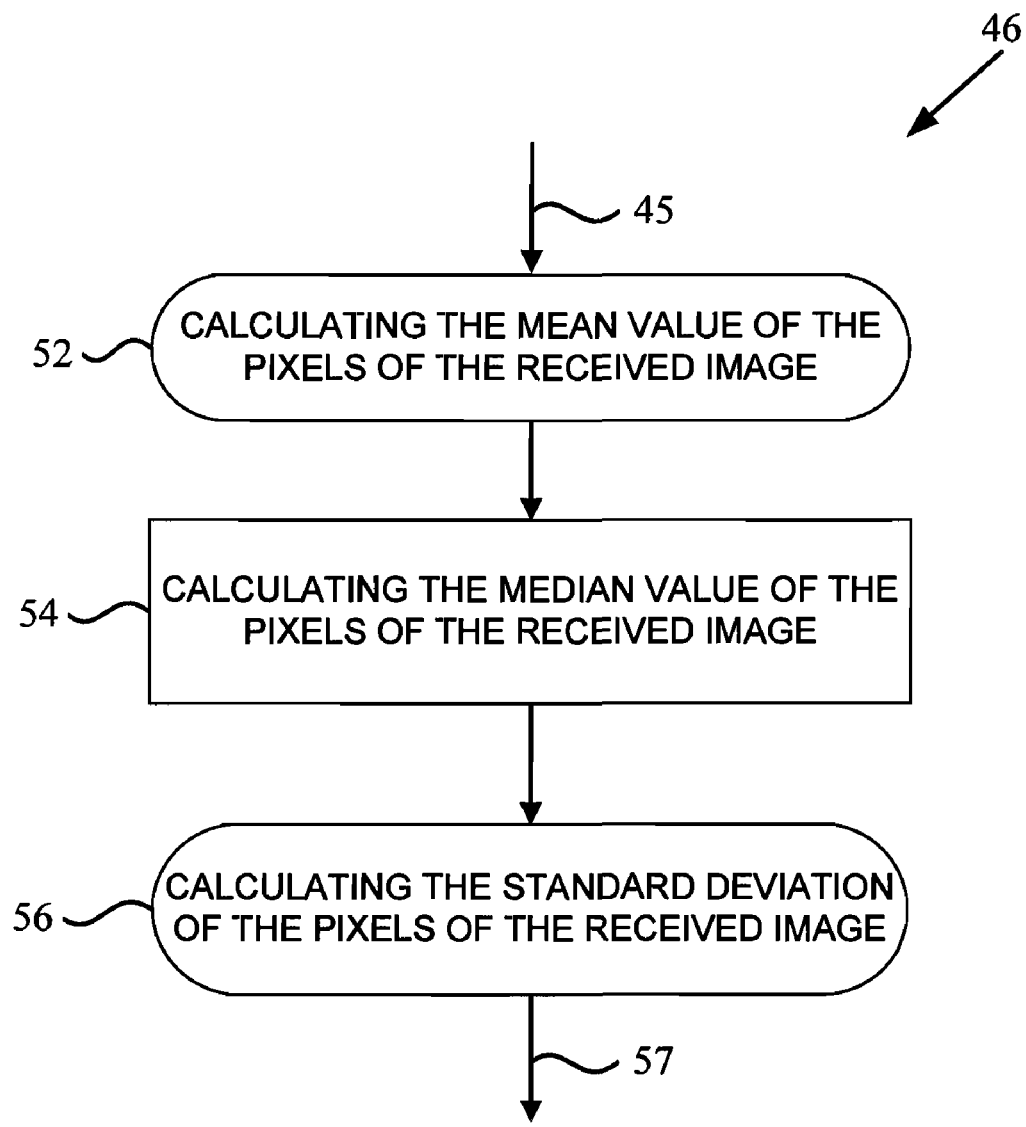
FIG. 3 shows a flowchart of one embodiment of a step for calculating image statistics of a received image, in accordance with the method for enhancing low-visibility imagery.

FIG. 3 shows a flowchart of one embodiment of step 46 of step 40. Step 46 may begin at step 52, where the mean value of the pixels of the received image is calculated. The mean value may be calculated according to standard calculating techniques. Next, step 46 may proceed to step 54, where the median value of the pixels of the received image is calculated. In some embodiments, step 46 may skip step 54 and proceed directly to step 56. The median value may be calculated according to standard calculating techniques. Step 46 may then proceed to step 56, where the standard deviation of the pixels of the received image is calculated. The standard deviation value may be calculated according to standard calculating techniques. In some embodiments of step 46, calculating image statistics of the received image may involve calculating the mean, median, and/or the standard deviation of the pixels of the received image. Following step 56, step 40 may proceed to step 47 along flow path 57.

Figure 4:
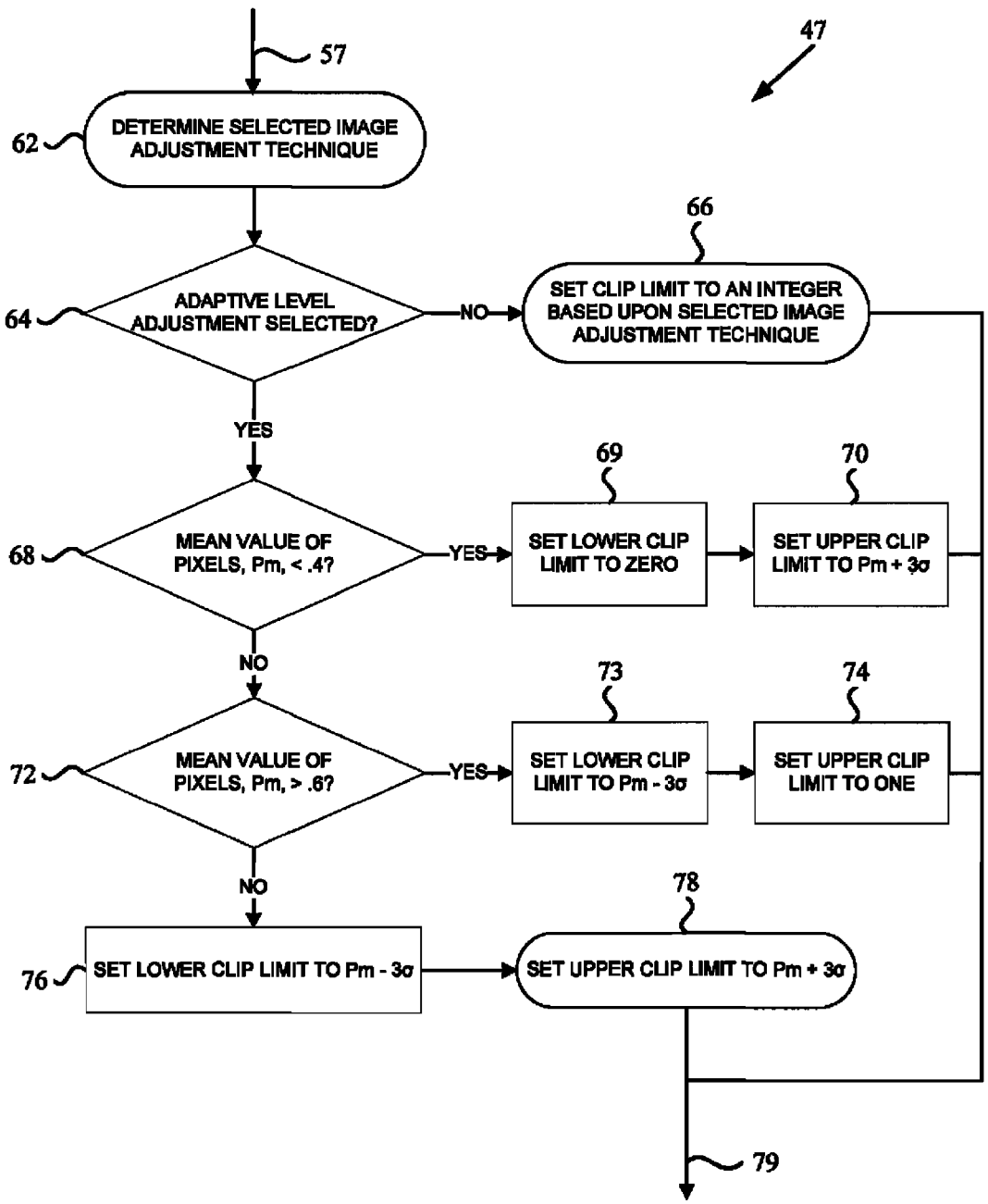
FIG. 4 shows a flowchart of one embodiment of a step for determining clip limits for the scaled image, in accordance with the method for enhancing low-visibility imagery.

FIG. 4 shows a flowchart of one embodiment of step 47 of step 40. Step 47 may begin at step 62, where the selected image adjustment technique is determined. Step 62 may be performed by processor 220 determining which technique was selected by user 260. Next, step 64 may involve determining whether an adaptive level adjustment has been selected. If the image adjustment technique selected is not an adaptive level adjustment, then step 47 may proceed to step 66 to set the clip limit equal to an integer based upon the selected image adjustment technique. In some embodiments, the integer value is greater than one. As an example, if a user chooses a user-defined adjustment, the clip limit may be set to an integer value of 2. Following step 66, step 47 may proceed to step 48 of FIG. 2 along flow path 79. If it is determined at step 64 that the image adjustment technique is an adaptive level adjustment, step 47 may proceed to steps 68 to 78 to determine one or more clip limits using the calculated image statistics. The calculated image statistics may include the mean value of the pixels of the received image, $P_m$, and the standard deviation value of the pixels of the received image, $\sigma$. In some embodiments, the calculated image statistics may include the median value of the pixels of the received image.

In one embodiment, step 47 involves determining a lower clip limit and an upper clip limit. In one embodiment, step 68 involves determining if $P_m<0.4$. The value 0.4 is a value that may be predetermined by a user of the system. In other embodiments, step 68 may involve determining if $P_m$ is less than a value other than 0.4, such as 0.3 or 0.5. If $P_m<0.4$, step 69 involves setting the lower clip limit to zero. Following step 69, step 70 involves setting the upper clip limit to $P_m+3\sigma$. In some embodiments, step 70 may involve setting the upper clip limit to $P_m+N\sigma$, where N is a user-selected value that is chosen to optimize the image processing. As an example, N may be any positive value, such as a value between about 1 and about 5. Following step 70, step 47 may proceed to step 48 of FIG. 2 along flow path 79. If at step 68 it is determined that $P_m>0.4$, then step 47 may proceed to step 72, where it is determined whether $P_m>0.6$. The value 0.6 is a value that may be predetermined by a user of the system. In other embodiments, step 72 may involve determining if $P_m$ is greater than a value other than 0.6, such as 0.5 or 0.7. If $P_m>0.6$, step 73 involves setting the lower clip limit to $P_m-3\sigma$. In some embodiments, step 73 may involve setting the lower clip limit to $P_m-N\sigma$, where N is a user-selected value that is chosen to optimize the image processing. As an example, N may be any positive value, such as a value between about 1 and about 5. Following step 73, step 74 involves setting the upper clip limit to one. Following step 74, step 47 may proceed to step 48 of FIG. 2 along flow path 79.

If, at step 72, it is determined that $P_m$ is not greater than 0.6, then step 47 may proceed to step 76, where the lower clip limit is set to $P_m-3\sigma$. In some embodiments, step 76 may involve setting the lower clip limit to $P_m-N\sigma$, where N is a user-selected value that is chosen to optimize the image processing. As an example, N may be any positive value, such as a value between about 1 and about 5. Step 78 may follow step 76 and may involve setting the upper clip limit to $P_m+3\sigma$. In some embodiments, step 78 may involve setting the upper clip limit to $P_m+N\sigma$, where N is a user-selected value that is chosen to optimize the image processing. As an example, N may be any positive value, such as a value between about 1 and about 5. Following step 78, step 47 may proceed to step 48 of FIG. 2 along flow path 79.

Figure 5:
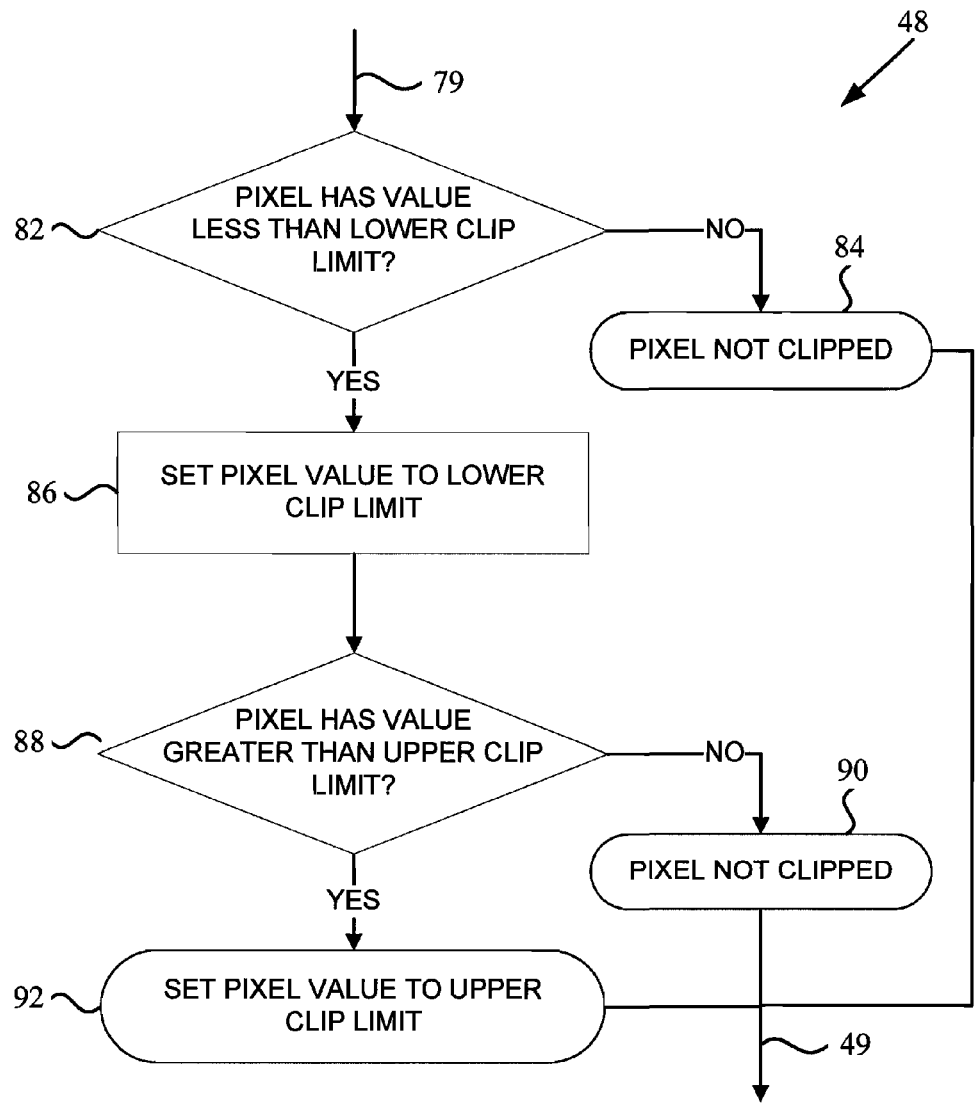
FIG. 5 shows a flowchart of one embodiment of a step for clipping a scaled image, in accordance with the method for enhancing low-visibility imagery.

FIG. 5 shows a flowchart of one embodiment of step 48 of step 40, which involves clipping the scaled image using the determined clip limits. Step 48 may begin at step 82, where it is determined if a pixel of the scaled image has a value less than the lower clip limit. If it is determined if a pixel of the scaled image has a value greater than the lower clip limit, step 84 involves not clipping the pixel. If a pixel of the scaled image has a value less than the lower clip limit, then step 86 involves setting the value of the pixel equal to the lower clip limit. Following step 86, step 88 involves determining if a pixel of the scaled image has a value greater than the upper clip limit. If it is determined if a pixel of the scaled image does not have a value greater than the lower clip limit, step 90 involves not clipping the pixel. If a pixel of the scaled image has a value greater than the upper clip limit, then step 92 involves setting the value of the pixel equal to the upper clip limit. Following either steps 84, 90, or 92, method 10 proceeds to step 50 along flow path 49.

Figure 6:
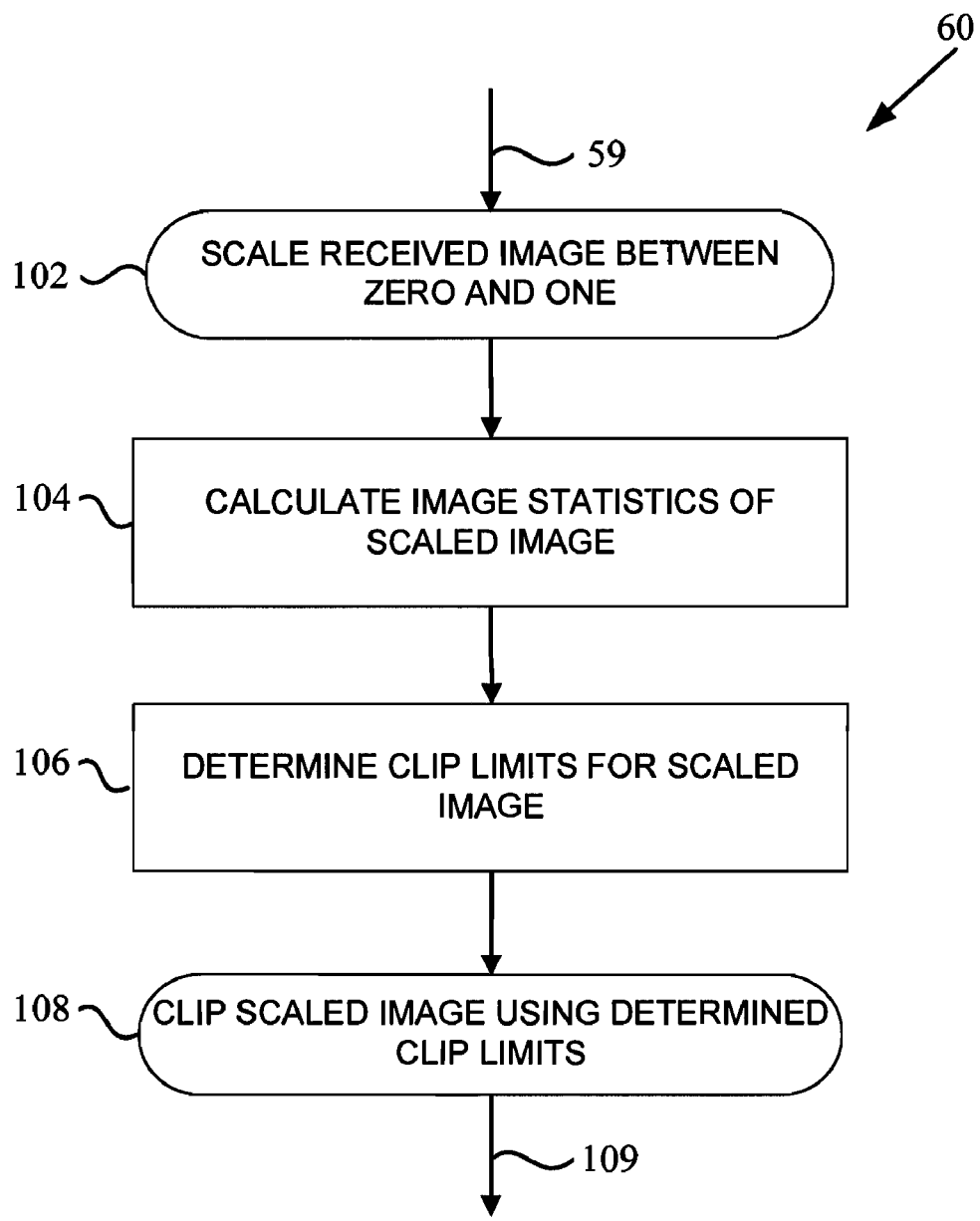
FIG. 6 shows a flowchart of one embodiment of a step for adjusting a filtered image, in accordance with the method for enhancing low-visibility imagery.

FIG. 6 shows a flowchart of one embodiment of step 60 of method 10. Step 60 may begin at step 102, which involves scaling the received adjusted and filtered image from step 50 between zero and one. Step 102 may be performed similar to step 44. Following step 102, step 60 may proceed to step 104, where image statistics of the scaled image are calculated. Step 104 may be performed similar to step 46. Next, step 106 involves determining the clip limits for the scaled image. Step 106 may be performed similar to step 47. Following step 106, step 60 may proceed to step 108, where the scaled image is clipped using the determined clip limits. Step 108 may be performed similar to step 47. Following step 108, method 10 may proceed to step 70 along flow path 109.

FIG. 7 shows a block diagram of one embodiment of a system 200 that may be used to implement a method for enhancing low-visibility imagery. System 200 may include a display 210, a processor 220, and a memory module 230. Display 210 and processor 220 may communicate via connection 240. Processor 220 and memory 230 may communicate via connection 250. Connections 240 and 250 may be wired or wireless. Display 210 may comprise any type of display as recognized by one having ordinary skill in the art. For example, display 210 may be a liquid crystal display, which may be commercially obtained from NEC, model number ASLCD72VX-BK-TA. Display 210 may be configured to display one or multiple images received from image source 270. In some embodiments, processor 220 may comprise any type of processing unit as recognized by one having ordinary skill in the art. For example, processor 220 may be a chip that may be commercially obtained from AMD, model number AMD A64 3200. Processor 220 may retrieve program instructions from memory module 230 to perform steps of method 10 as described herein. Memory module 230 may comprise any type of memory module as recognized by one having ordinary skill in the art. For example, memory module 230 may be DDR3 SDRAM, which may be commercially obtained from Samsung Corporation. Memory module 230 may contain program instructions stored therein. The program instructions may be executable by processor 220 to perform method 10. In some embodiments, processor 220 and memory module 230 reside within the same chip. A user 260 may interact with system 200 via display 210. As an example, user 260 may input information into system 200 via a keyboard, mouse, or other input device, as well as view images displayed on display 210.

An image source 270 may be operatively connected to processor 220 to transmit images to system 200 via connection 272. In some embodiments, image source 270 may be a video camera. For example, image source 270 may be a long-wave infrared camera, mid-wave infrared camera, or short-wave infrared camera. An example of a long-wave infrared camera suitable for use with system 200 is the BAE LTC550 developed by BAE Systems Corporation. In embodiments where image source 270 is a video camera, image source 270 may operate in other bands of the EM spectrum, such as the visible band. In some embodiments, image source 270 may operate in multiple bands of the EM spectrum. Image source 270 may be either an analog or digital camera. In some embodiments, image source 270 may be a still image camera. Connection 272 may be a wired or wireless connection.

In some embodiments, a system that may be used to implement a method for enhancing low-visibility imagery may comprise more than one image source, more than one processor, and more than one display. In such embodiments, each image source may operate in a specific band of the EM spectrum. In other embodiments, one or more image sources may be analog video cameras and one or more image sources may be digital video cameras. In such embodiments, each image source may be connected to a separate processor and display. In other embodiments, each image source may be connected to the same processor, with the processor being connected to multiple displays, where images from each individual image source are displayed on separate displays.

FIG. 8 shows an embodiment of a system 300 that may be used to implement a method for enhancing low-visibility imagery. FIG. 8 and the following description are intended to provide a brief, general description of a suitable computing environment in which an embodiment of the method for enhancing low-visibility imagery may be implemented. Although not required, the method for enhancing low-visibility imagery will be described in the general context of computer-executable instructions, such as program modules, being executed by a personal computer. Generally, program modules include routines, programs, objects, components, information structures, etc. . . . , that perform particular tasks or implements particular abstract information types. Moreover, those skilled in the art will appreciate that embodiments of the method for enhancing low-visibility imagery may be practiced with other computer system configurations, including hand-held devices, multiprocessor systems, microprocessor-based or programmable consumer electronics, network personal computers, minicomputers, mainframe computers, and the like. Embodiments of the method may also be practiced in distributed computing environments where tasks are performed by remote processing devices that are linked through a communications network. In a distributed computing environment, program modules may be located on both local and remote memory storage devices.

System 300 may include a general-purpose computing device in the form of a conventional personal computer 300, which includes processing unit 302, system memory 304 and system bus 306 that operatively couple various system components to other system components (e.g., system bus 306 operatively couples system memory 304 to processing unit 302). Examples of system bus 306 include a memory bus, memory bus controller, peripheral bus and local bus using any of a variety of known bus structures. System memory 304 may include read only memory, random access memory and basic input/output system.

System 300 further includes hard disk drive 316 for reading from and writing to a hard disk (not shown in FIG. 8) a magnetic disk drive 318 for reading from or writing to a removable magnetic disk 320 (e.g., 3.5-inch disk), and an optical disk drive 322 for reading from and writing to a removable optical disk 324 (e.g., CD-ROM and DVD). Hard disk drive 316, magnetic disk drive 318 and optical disk drive 322 are operatively connected to system bus 306 via hard disk drive interface 326, magnetic disk drive interface 328 and optical drive interface 330, respectively. The drives and their associated computer-readable media provide nonvolatile storage of computer readable instructions, information structures, program modules and other information for personal computer 300. The method steps of embodiments of the present method may be stored on a hard disk, magnetic disk 320 and optical disk 324. Although the exemplary environment described herein employs a hard disk, magnetic disk 320 and optical disk 324, it should be appreciated by those skilled in the art that other types of computer readable media that may store information accessible by a computer, (e.g., magnetic cassettes, flash memory cards, digital video disks, Bernoulli cartridges, random access memories and read only memories) may also be used in the exemplary operating environment without departing from the scope or spirit of embodiments of the method.

A user may enter commands and information into personal computer 300 via input devices such as keyboard 340 and pointing devices (e.g., mouse and trackball) (not shown in FIG. 8). Examples of input devices (not shown in FIG. 8) include a microphone, joystick, game pad, and satellite dish. Input devices may be operatively connected to processing unit 302 via universal serial bus (USB) port interface 344 that is operatively connected to system bus 306. Input devices may also be operatively connected to processing unit 302 via other interfaces (e.g., parallel port, serial port and game port) that are operatively connected to system bus 306. Monitor 346 is operatively connected to system bus 306 via video adapter 348. Other peripheral devices (e.g., speakers and printers) may be operatively connected to system 300 via other interfaces. System 300 may operate in a networked environment using logical connections to one or more remote computers such as remote computer 350 via network a network, such as a local area network, wide area network, and wireless network. Examples of remote computer 350 include a personal computer, server, router, network personal computer, peer device and network node.

Figure 9:
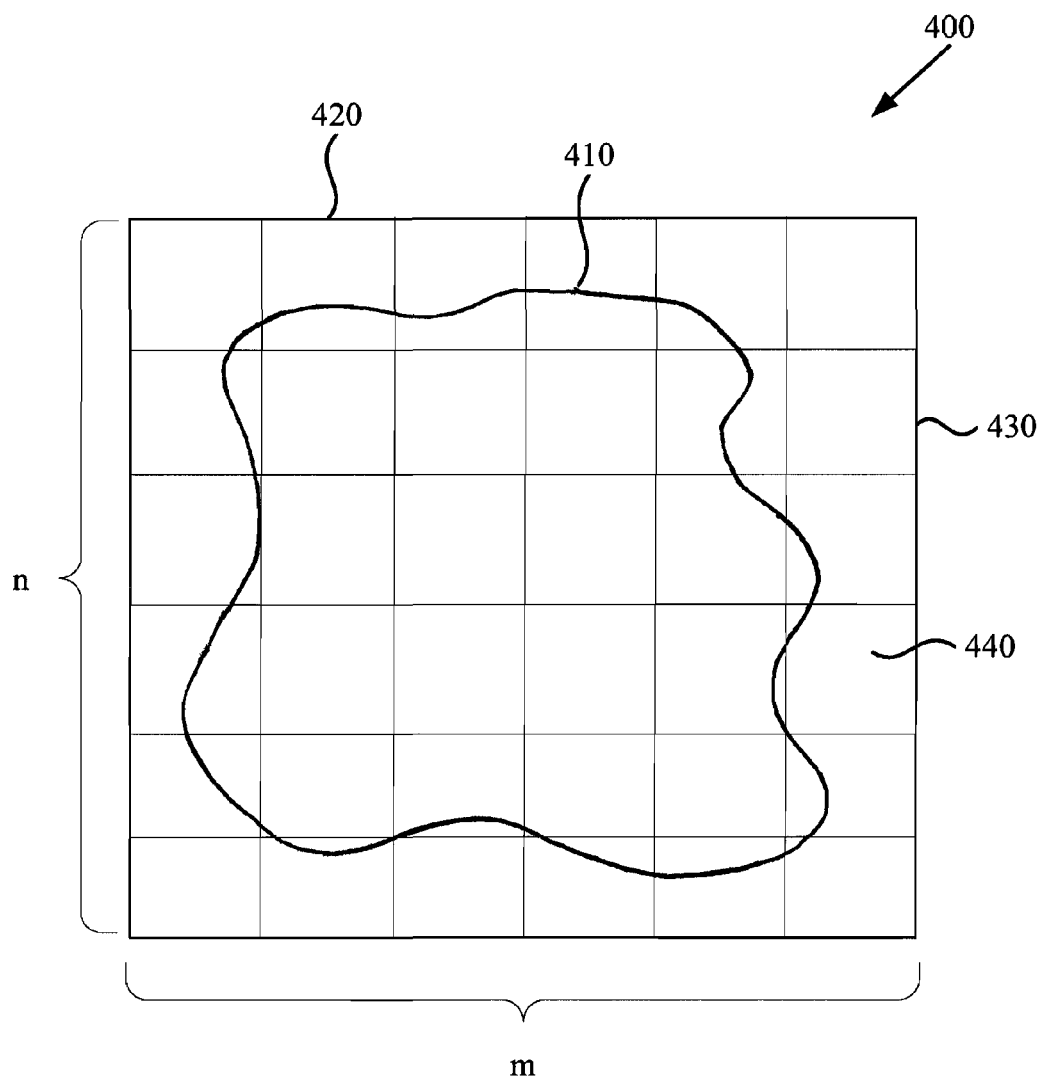
FIG. 9 shows a diagram of one embodiment of a matrix used in an adaptive level adjustment process, in accordance with the method for enhancing low-visibility imagery.

FIG. 9 shows a diagram of one embodiment of a matrix 400 used in an adaptive level adjustment process, in accordance with the method for enhancing low-visibility imagery. Matrix 400 may include an image 410 therein, such as the received image of method 10. Matrix 400 may be divided into m columns 420 and n rows 430. Matrix 400 may include n×m cells 440. Image 410 may be segmented into a matrix of n by m sub-images, with each cell 440 containing a sub-image. Matrix 400 provides for the ability to filter image 410 by filtering each of the sub-images located in cells 440 based on calculated image statistics. Breaking down image 410 into sub-images, and filtering each of the sub-images, may allow for higher resolution enhancement of image 410.

Many modifications and variations of the system and method for enhancing low-visibility imagery are possible in light of the above description. Therefore, within the scope of the appended claims, the system and method for enhancing low-visibility imagery may be practiced otherwise than as specifically described. Further, the scope of the claims is not limited to the embodiments disclosed herein, but extends to other embodiments as may be contemplated by those with ordinary skill in the art.

We claim:
1. A method comprising the steps of:
selecting an image filtering technique;
receiving an image from an image source;
processing the received image to provide a processed image, wherein the processing comprises the steps of
adjusting the received image to provide an adjusted image, the adjusting comprising the steps of selecting an image adjustment technique, scaling the received image between zero and one, calculating the mean value of the pixels of the scaled image, calculating the standard deviation value of the pixels of the scaled image, if the selected image adjustment technique is an adaptive level adjustment, then determining one or more clip limits using the calculated image statistics, wherein the calculated image statistics include the mean value of the pixels of the received image and the standard deviation value of the pixels of the received image, if the selected image adjustment technique is not an adaptive level adjustment, then setting the clip limit equal to an integer based upon the selected image adjustment technique, and clipping the scaled image using the determined clip limits,
filtering the adjusted image according to the selected image filtering technique to provide a filtered image, and
adjusting the filtered image; and
displaying the processed image to a user.

2. The method of claim 1, wherein the image filtering technique is selected from the group of image filtering techniques consisting of histogram equalization, band-pass filtering, and adaptive enhancement filtering.

3. The method of claim 1, wherein the step of determining one or more clip limits using the calculated image statistics comprises the steps of:
determining a lower clip limit, wherein
if the mean value of the pixels of the received image is less than about 0.4, the lower clip limit is set to zero,
if the mean value of the pixels of the received image is greater than about 0.6, then the lower clip limit is set to the mean value of the pixels of the received image minus three times the standard deviation value of the pixels of the received image, and
if the mean value of the pixels of the received image is greater than about 0.4 and less than about 0.6, the lower clip limit is set to the mean value of the pixels of the received image minus three times the standard deviation value of the pixels of the received image; and
determining an upper clip limit, wherein
if the mean value of the pixels of the received image is less than about 0.4, the upper clip limit is set to the mean value of the pixels of the received image plus three times the standard deviation value of the pixels of the received image,
if the mean value of the pixels of the received image is greater than about 0.6, the upper clip limit is set to one, and
if the mean value of the pixels of the received image is greater than about 0.4 and less than about 0.6, the upper clip limit is set to the mean value of the pixels of the received image plus three times the standard deviation value of the pixels of the received image.

4. The method of claim 3, wherein the step of clipping the scaled image using the determined clip limits comprises the steps of:
determining if a pixel of the scaled image has a value less than the lower clip limit;
if a pixel of the scaled image has a value less than the lower clip limit, then setting the value of the pixel equal to the lower clip limit;
determining if a pixel of the scaled image has a value greater than the upper clip limit; and
if a pixel of the scaled image has a value greater than the upper clip limit, then setting the value of the pixel equal to the upper clip limit.

5. The method of claim 1, wherein the step of adjusting the filtered image comprises the steps of:
scaling the received image between zero and one;
calculating the image statistics of the scaled image;
determining the clip limits for the scaled image; and
clipping the scaled image using the determined clip limits.

6. The method of claim 1, wherein the step of adjusting the filtered image comprises the step of performing an adaptive level adjustment, wherein the level and type of adaptive level adjustment depends upon calculated image statistics of the received image, wherein the calculated image statistics include the mean value of the pixels of the received image, the and the standard deviation value of the pixels of the received image.

7. The method of claim 1, wherein the step of adjusting the filtered image comprises the step of performing an adjustment based on a user-defined adjustment algorithm.

8. The method of claim 1, wherein the image source is a video camera.

9. An image processing system comprising:
a display;
a processor operatively connected to the display; and
a memory module operatively connected to the processor, the memory module having program instructions stored therein, wherein the program instructions are executable by the processor to perform a method for image processing comprising the steps of:
selecting an image filtering technique;
receiving an image from an image source;
processing the received image to provide a processed image, wherein the processing comprises the steps of
adjusting the received image to provide an adjusted image, the adjusting comprising the steps of selecting an image adjustment technique, scaling the received image between zero and one, calculating the mean value of the pixels of the scaled image, calculating the standard deviation value of the pixels of the scaled image, if the selected image adjustment technique is an adaptive level adjustment, then determining one or more clip limits using the calculated image statistics, wherein the calculated image statistics include the mean value of the pixels of the received image and the standard deviation value of the pixels of the received image, if the selected image adjustment technique is not an adaptive level adjustment, then setting the clip limit equal to an integer based upon the selected image adjustment technique, and clipping the scaled image using the determined clip limits,
filtering the adjusted image according to the selected image filtering technique to provide a filtered image, and
adjusting the filtered image; and
displaying the processed image to a user.

* * * * *